United States Patent [19]

DiLucia

[11] Patent Number: 4,565,459

[45] Date of Patent: Jan. 21, 1986

[54] PHONETIC CHINESE PRINTING APPARATUS

[76] Inventor: Gilbert DiLucia, 800 Fifth Ave., New York, N.Y. 10021

[21] Appl. No.: 615,923

[22] Filed: Jun. 4, 1984

[51] Int. Cl.⁴ ............................................. B41J 5/00
[52] U.S. Cl. .................................................. 400/110
[58] Field of Search ............................... 400/110, 484

[56] References Cited

U.S. PATENT DOCUMENTS

| | | | |
|---|---|---|---|
| 1,247,585 | 11/1917 | Shah | 400/110 |
| 1,489,616 | 4/1924 | Stickney | 400/110 X |
| 1,646,407 | 10/1927 | Jones | 400/110 X |
| 2,471,807 | 5/1949 | Yen | 400/110 |
| 3,881,586 | 5/1975 | Arvai | 400/110 |

*Primary Examiner*—Clifford D. Crowder
*Attorney, Agent, or Firm*—Yuter, Rosen & Dainow

[57] ABSTRACT

A typing or printing apparatus for communicating in the Chinese language, wherein the characters typed or printed represent separate sounds, and the characters of the font are currently employed characters of the Chinese language.

1 Claim, 10 Drawing Figures

INITIALS used only for the initials of the character words

| | LATIN ALPHABET | BPMF | PINYIN | DCA | ENGLISH TRANSLATION |
|---|---|---|---|---|---|
| 1. | B | ㄅ | bu | 不 | negative |
| 2. | P | ㄆ | ping | 平 | peace |
| 3. | M | ㄇ | men | 們 | plural |
| 4. | F | ㄈ | fu | 父 | father |
| 5. | D | ㄉ | de | 的 | possessive |
| 6. | T | ㄊ | ta | 他 | he |
| 7. | N | ㄋ | ni | 你 | you |
| 8. | L | ㄌ | le | 了 | completed action |
| 9. | G | ㄍ | guo | 國 | country |
| 10. | K | ㄎ | kan | 看 | see |
| 11. | H | ㄏ | huo | 火 | fire |
| 12. | JY | ㄐ | jy | 己 | self |
| 13. | Q (CHY) | ㄑ | qi | 請 | please |
| 14. | X (SY) | ㄒ | sy | 西 | west |

*FIG. 2A*

INITIALS used as initials or as full syllables

| | LATIN ALPHABET | BPMF | PINYIN | DCA | ENGLISH TRANSLATION |
|---|---|---|---|---|---|
| 15. | Z (Zh) | ㄓ | zhong | 中 | middle |
| 16. | CH | ㄔ | cha | 茶 | tea |
| 17. | SH | ㄕ | sh | 是 | to be |
| 18. | R | ㄖ | r | 日 | sun |
| 19. | DZ | ㄗ | tsu | 子 | child |
| 20. | C (Ts) | ㄘ | tsai | 才 | talent |
| 21. | S | ㄙ | si | 司 | manage |

FIG. 2B

FINALS used alone as syllables or combined with initials

| | LATIN ALPHABET | BPMF | PINYIN | DCA | ENGLISH TRANSLATION |
|---|---|---|---|---|---|
| 22. | Ah | ㄚ | ah | 阿 | exclamation |
| 23. | O | ㄛ | o | 哦 | exclamation |
| 24. | E | ㄜ | e | 惡 | evil |
| 25. | Ai | ㄞ | ai | 愛 | love |
| 26. | Ei | ㄟ | ei | 艾 | flora |
| 27. | Au | ㄠ | au | 幺 | coil |
| 28. | Ou | ㄡ | ou | 凹 | concave |
| 29. | An | ㄢ | an | 安 | peace |
| 30. | En | ㄣ | en | 恩 | blessing |
| 31. | Ang | ㄤ | ang | 卬 | rise |
| 32. | Eng | ㄥ | eng | 盈 | to fill up |
| 33. | Er | ㄦ | er | 耳 | ear |
| 34. | I | ㄧ | i | 宜 | harmony |

FIG. 2C

FINALS used alone as syllables or combined with initials

| | LATIN ALPHABET | BPMF | PINYIN | DCA | ENGLISH TRANSLATION |
|---|---|---|---|---|---|
| 35. | U | ㄨ | u | 屋 | house |
| 36. | Yu | ㄩ | yu | 雨 | rain |
| 37. | Ya | ㄚ | ya | 牙 | tooth |
| 38. | Ye | ㄝ | ye | 也 | also |
| 39. | Yai | ㄞ | yai | 涯 | waterfront |
| 40. | Yau | ㄠ | yau | 要 | want |
| 41. | You | ㄡ | you | 有 | to have |
| 42. | Yan | ㄢ | yan | 言 | words |
| 43. | Yin | ㄣ | yin | 音 | sound |
| 44. | Yang | ㄤ | yang | 羊 | goat |
| 45. | Ying | ㄥ | ying | 迎 | welcome |
| 46. | Wa | ㄨㄚ | wa | 娃 | doll |
| 47. | Wo | ㄨㄛ | wo | 我 | I |

*FIG. 2D*

FINALS used alone as syllables or combined with initials

| | LATIN ALPHABET | BPMF | PINYIN | DCA | ENGLISH TRANSLATION |
|---|---|---|---|---|---|
| 48. | Wai | ㄨㄞ | wai | 外 | outside |
| 49. | Wei | ㄟ | wei | 威 | Majestic |
| 50. | Wan | ㄨㄢ | wan | 萬 | 10,000 |
| 51. | Wen | ㄨㄣ | wen | 問 | ask |
| 52. | Wang | ㄨㄤ | wang | 王 | king |
| 53. | Weng | ㄨㄥ | weng | 翁 | elder |
| 54. | Ywe | ㄩㄝ | ywe | 月 | moon |
| 55. | Yuan | ㄩㄢ | yuan | 園 | garden |
| 56. | Yun | ㄩㄣ | yun | 允 | allow |
| 57. | Yung | ㄩㄥ | yung | 永 | eternal |

| English: | These | two | (measure word) | books. |
|---|---|---|---|---|
| Chinese: | 這 | 兩 | 本 | 書 |
| Pinyin: | Zhei | liang | ben | shu. |
| BPMF: | ㄓㄟ | ㄌㄧㄤ | ㄅㄣ | ㄕㄨ |
| DCA: | 中艾 | 了宜印 | 不恩 | 是屋 |

| English: | good; | big; | small; | person; |
|---|---|---|---|---|
| Chinese: | 好 | 大 | 小 | 人 |
| Pinyin: | hao; | da; | xiao; | ren; |
| BPMF: | ㄏㄠ | ㄉㄚ | ㄒㄧㄠ | ㄖㄣ |
| DCA: | 火幺 | 的阿 | 西宜幺 | 日恩 |

| English: | to think; | friend; | business-trade; |
|---|---|---|---|
| Chinese: | 想 | 朋友 | 買賣 |
| Pinyin: | xiang; | pengyou; | maimai; |
| BPMF: | ㄒㄧㄤ | ㄆㄥ ㄧㄡ | ㄇㄞ ㄇㄞ |
| DCA: | 西宜印 | 平盈宜有 | 們愛們愛 |

*FIG. 5A*

| | | | |
|---|---|---|---|
| English: | hundred; | vehicle; | restaurant; |
| Chinese: | 百 | 車 | 飯店 |
| Pinyin: | bai; | che; | fandian; |
| BPMF: | ㄅㄞ | ㄔㄜ | ㄈㄢ ㄉㄧㄢ |
| DCA: | 不愛 | 茶惡 | 父安 的宜安 |

| | | | |
|---|---|---|---|
| English: | to know; | very much; | train; |
| Chinese: | 知道 | 很 | 火車 |
| Pinyin: | zhidao; | hen; | huoche; |
| BPMF: | ㄓ ㄉㄠ | ㄏㄣ | ㄏㄨㄛ ㄔㄜ |
| DCA: | 中 的ㄠ | 火恩 | 火屋哦 茶惡 |

| | |
|---|---|
| English: | ship; |
| Chinese: | 船 |
| Pinyin: | chuan; |
| BPMF: | ㄔㄨㄢ |
| DCA: | 茶屋安 |

*FIG. 5B*

PHONETIC CHINESE PRINTING APPARATUS

This invention relates to written communication in the Chinese language, and is more particularly directed to a typewriter or printer for printing the Chinese language, and a format of characters for use on such typewriters or printers.

The Chinese do not have an alphabet, nor have they ever had one. The written word for the Chinese has always been, as it is today, a configuration of lines and curves called a "character". This form can represent, singly or in combination, an idea, a picture or a sound.

Each word is expressed by a separate character. To learn Chinese, one must memorize each character individually. There are no short cuts to this memorization requirement. Certain words are in categories, having common calligraphical elements, which will give a clue as to which general subject they might refer. This however, is of little real help. The memorization problem is always there—a long and tedious process.

Estimates vary as to how many characters one must learn. To read a Chinese newspaper, for example, between 2,000 and 3,000 characters seems to be the frequent range of opinion. One would be considered fairly literate knowing 3,000 to 5,000 characters, and one would be considered scholarly if one knew from 5,000 to 10,000 characters.

Not only must Chinese characters be memorized, but they must be written in a precise and standard manner. Brush strokes must be in "order". The order of strokes is strictly adhered to, and is generally from left to right, and from top to bottom. To write "well", one must also do things like flick the brush or pen to produce hooks on certain strokes, and drag the brush on the last stroke of certain characters. Learning to write Chinese indeed requires a great amount of time and painstaking attention to detail.

According to tradition, characters originated in the prehistoric period, in the form of "graphies"—representational drawings of persons and objects. In 2500 B.C. Huang-ti, the founder of the Chinese empire, began the systemization of Chinese writings since the graphies had become more numerous and more complex. Graphies later had more lines added to them or were combined with other graphies, becoming the "characters" we know today.

Over the ages, as more and more characters were developed, efforts were made to compile indexes for ease of reference. Circa 800 B.C., the Grand Recorder Chou put together a catalogue of characters then in use, and attempted to standarize and simplify their shapes. Later, about 213 B.C., the Prime Minister Li-ssu compiled a new index of 3,300 characters. This particular index had a long and lasting effect on the standardization of the writing of Chinese characters, since its popularity caused it to be revised many times as the authoritative source for scholars.

As the Chinese empire expanded, so did the number of characters increase as names were given to new things. By the beginning of the Christian era the seventh edition of Li-ssu's index contained 7,380 characters.

As to the total number of characters in existence, one will hear and read that there are as many as 80,000, but this is not a realistic figure. The famous Jesuit scholar Dr. L. Wieger, S.J. points out that: "The dictionary of K'ang-hsi (A.D. 1716) contains 40,000 characters . . . 4,000 characters in common use; 2,000 proper names and doubles of limited use; 34,090 monstrosities of no practical use. We are far from the legendary number of 80,000 usual characters, ascribed to the Chinese language." ("Chinese Characters" by Dr. L. Weiger, S. J., Paragon Book Reprint Corp. and Dover Publications.)

Originally, characters were written with a thin bamboo tube on top of which was a small cup-like shape which held ink. A small wick in the tube regulated the ink flow. With such an instrument the writer could draw straight lines, curves, ovals, and circles, and as the inscriptions on old bronzes indicate, these lines were of uniform thickness as the ink flowed from the tube-pen.

Around the time of the publication of Li-ssu's first index, c. 213 B.C., one Ch'eng-miao invented a pencil of soft wood, which had a fibrous point. This instrument allowed the writer to produce characters in much less time than the tube-pen did, but because of the soft point, rounded strokes could only be written in a square form, and curves gave way to broken angles.

The wooden pen became very popular with public scribes, who used them for official purposes in drawing-up public documents, and thus the style of writing produced by the fibrous tipped pencil became the "official" style throughout the empire.

At a later date, the writing brush was conceived by the General Meng-t'ien during a military campaign, and this type of brush is used up to the present day. However, the advent of the brush produced much change in the shape of characters, since brush strokes taper in thickness as the brush starts or finishes a stroke. Around the year 200 A.D. a scholar called Hsu-shen published a dictionary called the Shou-wen which was based on the work of Li-ssu, and it etymologically explained, amended and classified a total of 10,516 characters, many of which had become almost unintelligible from the original tube-pen forms. All dictionaries of competent scholarship over the past seventeen centuries, up to our present day, have their roots in the Shou-wen. (See Dr. L. Weiger, S.J. OP. CIT.)

One notices in this short review of the history of Chinese calligraphy that for over 5,000 years the main thrust of Chinese writing has been the creation, simplification and standardization of characters. Even as late as 1956, the Communist Chinese embarked on a program of "simplification" of Chinese characters by reducing the number of brush strokes in 544 of the more complicated characters.

It must be remembered, however, that the mere reduction in the number of strokes in certain characters, is not enough to get to the crux of the problem facing written Chinese today: The need to bring the Chinese written language into the mainstream of twentieth century communications. Not only must the language be capable of very fast transmission, reception and translation, but it must be easily taught and learned by non-Chinese. At the present time, for example, a well-educated Chinese can type a letter on a Chinese typewriter at the rate of 500 characters per hour. This is hardly twentieth century speed, but it must be realized that a Chinese typewriter has a tray of about 3,000 moveable type characters from which the typist must first find the character before hitting the key to register the character on paper. (Other trays of 3,000 characters can be inserted into the lower part of the typewriter to provide additional characters if needed.)

BACKGROUND OF THE INVENTION

To simplify the teaching of the pronunciation of Chinese characters, a Chinese phonetic alphabet was promulgated in China after 1911 A.D. Typewriters have been disclosed for typing such phonetic characters on a keyboard of the type conventionally employed for typing Roman characters. Systems of this type are disclosed, for example, in Stickney U.S. Pat. No. 1,489,616, and Jones U.S. Pat. No. 1,646,407. In these systems, the phonetic characters are typed in accordance with the sounds of the Chinese words to be depicted. The phonetic symbols are not conventional Chinese characters, however, so that the reader must have a sufficient knowledge of the phonetic alphabet in order to translate the sounds they represent into a conventional Chinese language.

This Chinese phonetic alphabet is known as the Bwo Pwo Mwo Fwo system (hereinafter referred to as the BPMF), which employs fifty-seven specially formed characters that are not conventional characters of the Chinese language. The BPMF system is roughly equivalent to the ABC's in English language systems. It is taught to school children to help them learn the pronunciation of characters. BPMF is looked upon by the Chinese as a set of phonetic aids rather than as an alphabet, in the Western sense of the term. On mainland China, the BPMF system has been generally absorbed by the PINYIN system, which employs Roman or Latin alphabet characters to spell out the words. For example, the phrase "I am an American" is written in PINYIN as "wo shi mei guo ren". With PINYIN, the Chinese characters can be bypassed completely in the study, writing and communicating of Chinese. It is superior to the BPMF in the sense that it employs an alphabet of worldwide recognition, rather than a set of phonetic symbols, which tend to look like hieroglyphics to all but a student of linguistics.

It is obvious to the Chinese, as well as to any student of Chinese, that PINYIN or any other phonetic alphabet could be used in place of written Chinese characters. In fact, certain linguistic authorities feel that it is only a matter of time before PINYIN replaces characters in Chinese writing. But they feel this transition will take a considerable amount of time. ("Language and Linguistics in the People's Republic of China", edited by Winifred P. Lehmann, University of Texas Press, 1975.) (Note that modern Turkish and Vietnamese are written in the Latin Alphabet.)

In spite of the ease of writing, the use of PINYIN is not widespread in mainland China, even though it was introduced as early as 1956. If the Chinese wanted to do so, they could correspond with each other, and with non-Chinese outside of China in the Latin alphabet. Chinese in written form could be taught exclusively in PINYIN to Chinese and non-Chinese alike, and the difficult task of learning characters could be eliminated entirely. Chinese calligraphy would, however, die away.

The use of PINYIN has had limited popularity, possibly because it may be culturally impossible for the Chinese themselves to advocate the discarding of Chinese characters. The Chinese consider calligraphy an art; something beautiful to learn and to pass on to future generations. Chinese culture and civilization are inextricably tied to Chinese calligraphy. The retention of Chinese calligraphy is thus a form of cultural inertia. Movement away from Chinese calligraphy may thus be considered disloyal to the Chinese heritage.

SUMMARY OF THE INVENTION

The present invention is therefore directed to the provision of means readily enabling the typing and printing in the Chinese language, overcoming the above disadvantages of the known phonetic and PINYIN systems, while perpetuating Chinese calligraphy.

Briefly stated, in accordance with the preferred embodiment of my invention, I provide a font of characters, hereinafter referred to as "DCA" alphabet (DiLucia Chinese Alphabet), that I substitute for the fifty-seven Chinese phonetic symbols in the BPMF system, the characters employed in accordance with the invention being specially chosen conventional Chinese characters. The Chinese characters that I have chosen are selected on the basis of their familiarity and importance to the Chinese, and their phonetic association with the syllables they represent. In accordance with the invention, it is no longer necessary to learn a separate set of characters related only to phonetics and, further, a simplification of typing and printing in the Chinese language does not require the memorization of hundreds of conventional Chinese characters.

The DCA solves the dilemma of how to bring Chinese calligraphy into the twentieth century without destroying it in the process. The DCA uses all elements of Chinese calligraphy, and thus preserves the Chinese heritage.

While the font in accordance with the invention is intended to act primarily as a vehicle by which business and social correspondence can be effected, it simultaneously preserves Chinese calligraphy and Chinese culture. The use of the traditional Chinese characters for reading or writing literature will be preserved.

Instead of typing at the rate of five hundred Chinese words per hour, when employing the alphabet in accordance with the invention a typist will be able to type at normal Western typing speed.

BRIEF DESCRIPTION OF THE DRAWINGS

In order that the invention will be more clearly understood, it will now be disclosed in greater detail with reference to the accompanying drawings, wherein.

DETAILED DISCLOSURE OF THE INVENTION

In accordance with my invention, the DCA alphabet serves as an adjunct to PINYIN, and BPMF, but not to replace them. Since the BPMF is the basis for PINYIN and the DCA alphabet, it is simple to switch from one system of writing to either of the other two.

In order to assure the correct representation of the various Chinese and BPMF characters discussed herein, these characters will be depicted only in the accompanying drawings.

Figure 1:
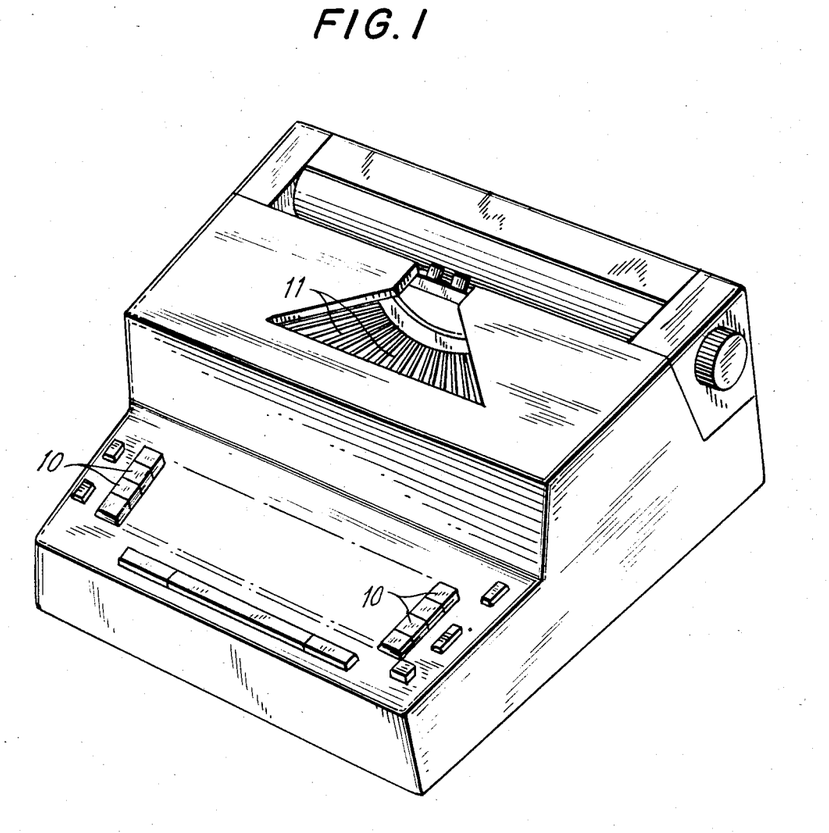
FIG. 1 is a perspective view of a conventional typewriting apparatus that may employ the format of Chinese characters in accordance with the invention.

As discussed above, in accordance with my invention, I provide a font of characters, for a typewriter, or wordprocessor or the like printer, comprised of a selected group of conventional Chinese characters, i.e., characters in general use and not solely phonetic characters such as the BPMF system characters. The characters in accordance with my font may be employed on the keys 10 and printbars 11 of a conventional English language typewriter as illustrated in FIG. 1. It is of course apparent that any conventional typewriting apparatus, word processor or printing apparatus such as a line printer or the like may be employed, in accordance with the invention.

The characters in accordance with the preferred embodiment of the invention are illustrated in FIG. 2, along with the corresponding PINYIN and BPMF representation and the corresponding phonetic letter of the English alphabet and the English translation of the corresponding character of the DCA alphabet. The preferred characters in accordance with the invention are referred to hereinafter as the DCA alphabet.

The characters of DCA alphabet are conventional Chinese characters, chosen on the basis of the following considerations:

1. Their importance in the written language;
2. their esthetic value;
3. their ability to illustrate representational strokes in Chinese calligraphy;
4. their simplicity;
5. their historical value;
6. their frequency of use in the Chinese language.

The four diacritical marks indicating the four "tones" used in spoken Chinese can be used in addition to the DCA alphabet to help identify homonyms. One notices that there can be, say, fifteen ways of defining and writing a given word in Chinese. Perhaps 3 will be in the first tone, 5 in the second tone, 4 in the third tone and 3 in the fourth tone. By placing the tone marking -, /, , or / for first, second, third or fourth tone, the reader or translator will be helped in identifying the word as it is written in PINYIN, BPMF or the DCA alphabet. In addition, the context of the sentence will also help to indicate the meaning of the word.

Figure 2A:
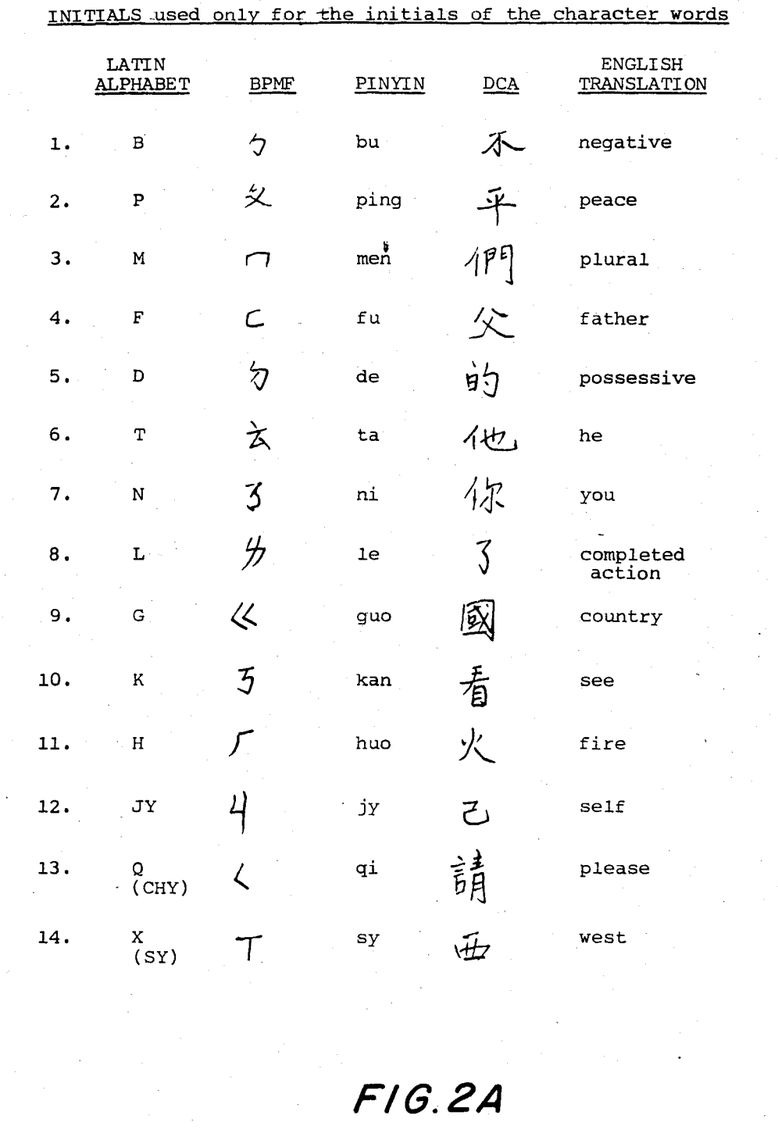
FIGS. 2A-2E is a list showing the correspondence between PINYIN, BPMF, and the alphabet in accordance with the invention, hereinafter referred to as the DCA, as well as the Latin alphabet and the English translation of the Chinese characters used in the DCA.
Figure 2B:
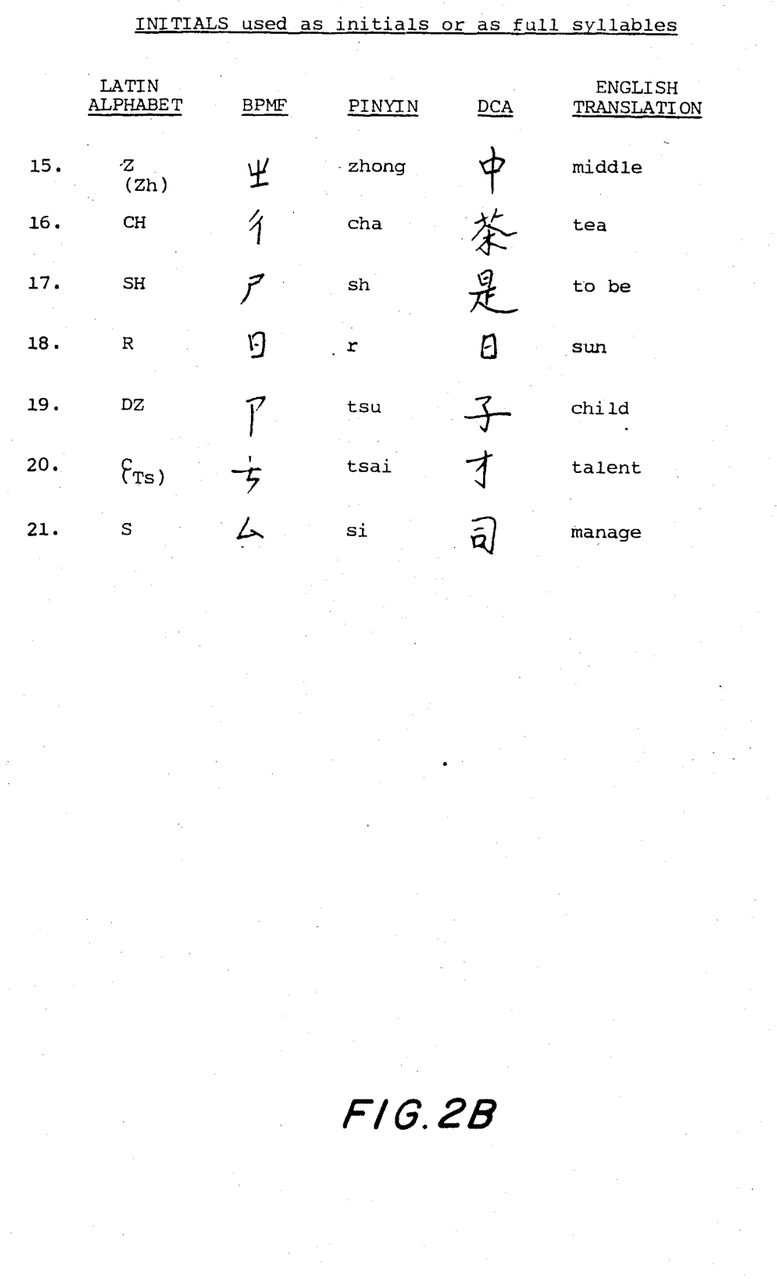
Figure 2C:
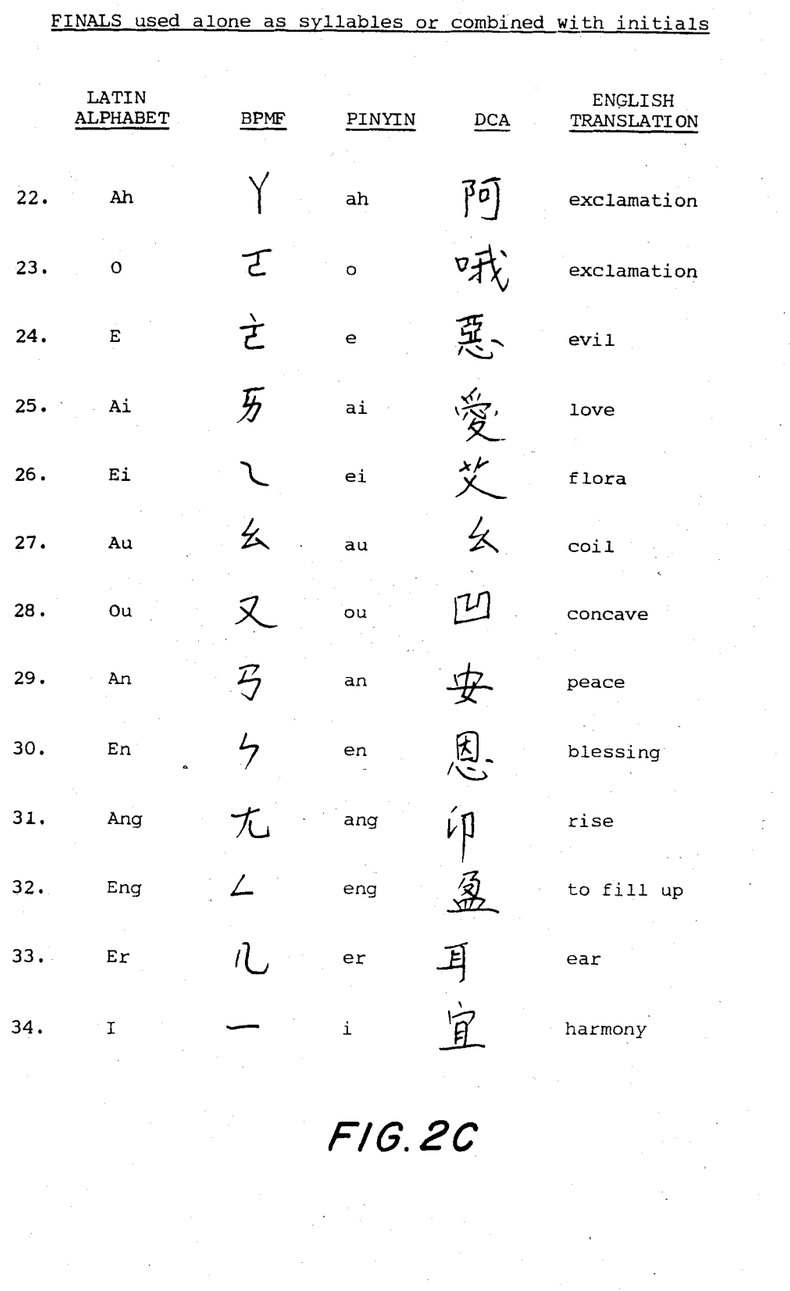

Particular note should be taken of the fact that in Chinese, subject pronouns and object pronouns are the same words, and that a qualifying word DE (FIG. 2, No. 5) represents posession.

Figure 2D:
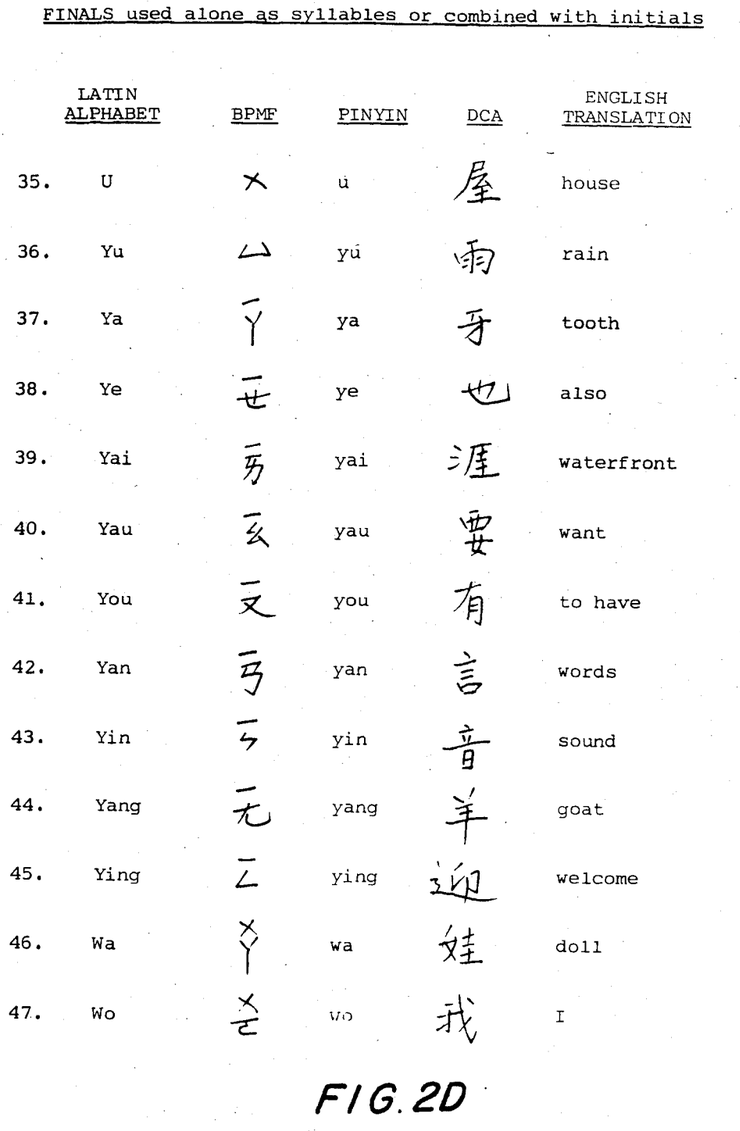
Figure 2E:
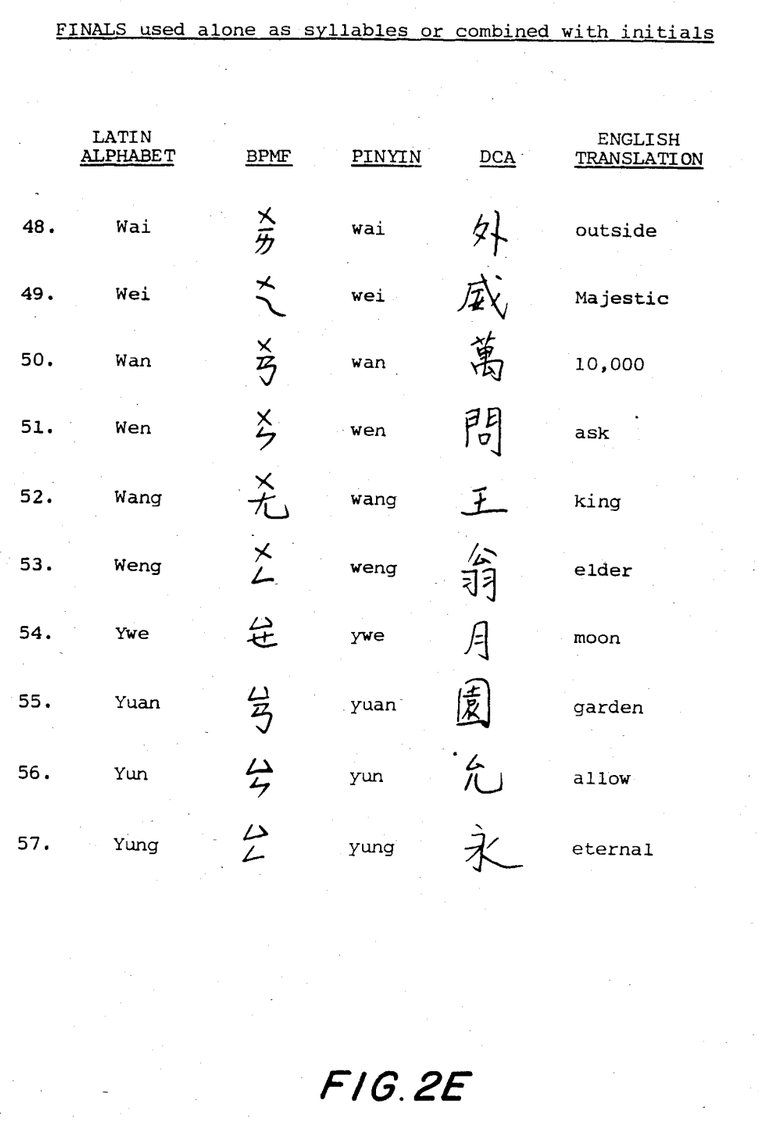

De, (FIG. 2, No. 5) is simply added to the pronoun form to convert it to a possessive pronoun. In the DCA the initial D is represented by de (FIG. 2, No. 5), while wo (FIG. 2, No. 47), ni (FIG. 2, No. 7), ta (FIG. 2, No. 6), and men (FIG. 2, No. 3), (I, You, He and Plural) are used to represent W, N, T and M. Also note that L is represented by le (FIG. 2, No. 8), which indicates completed action or past tense. All these are very important characters in the written Chinese language, and are made part of the DCA.

Many more grammatical words are thus incorporated into the DCA alphabet as a means of preserving the written form of the Chinese language and, at the same time, employing words which will facilitate the perpetuation of Chinese character writing for those who wish to study it further. Another positive factor in using these important grammatical words is their high frequency of use.

Any conventional typewriter, word processor or printer can be equiped with the DCA alphabet. Since there are only 57 letters in the preferred embodiment of the DCA alphabet there is ample space on the standard Roman Alphabet typewriter keyboard to fit in all 57 letters conveniently. (See diagram of suggested keyboard arrangement.)

In adapting the DCA alphabet to the standard typewriter keyboard, the four diacritical marks for the Chinese tones have been included. In addition, to make use of the five extra spaces on the keyboard, the following words were inserted: dollar (mei qin), yuan (unit of Chinese currency), thank you (shei), the word "gong" which when used together with the word "si", already on the keyboard, means "business company" or "corporation", and the negative "mei".

"Zero" can be written in the Chinese Character, or 0, and placed on the typewriter in either form. The word "ten" can be expressed by using the "plus" sign, +.

The interogative suffix, "ma", and the sentence particle "ma", can be omitted when using the DCA alphabet since the question mark, ?, indicates an interrogatory sentence.

In using the DCA alphabet it is recommended to put spaces between words, for the sake of clarity.

The concept underlying the DCA alphabet is thus the formulation of an alphabet with Chinese characters replacing the 57 phonetic sounds in the BPMF.

The first 14 characters in the DCA alphabet, as in the BPMF, are used only for the initials (i.e. The first letter of the PINYIN spelling) of the character words. The next 7 characters (also initials) are used as initials or as full syllables. The next 15 (finals, i.e. the last syllable of the PINYIN spelling 22 through 36) can be used alone as syllables or they can be combined with initials. The last group (complex finals, 37 through 57) can be used alone as syllables or can be combined with initials. ("Reading and writing Chinese", William McNaughton, Charles E. Tuttle Co., Inc., Rutland, UT, 1979).

Figure 3:
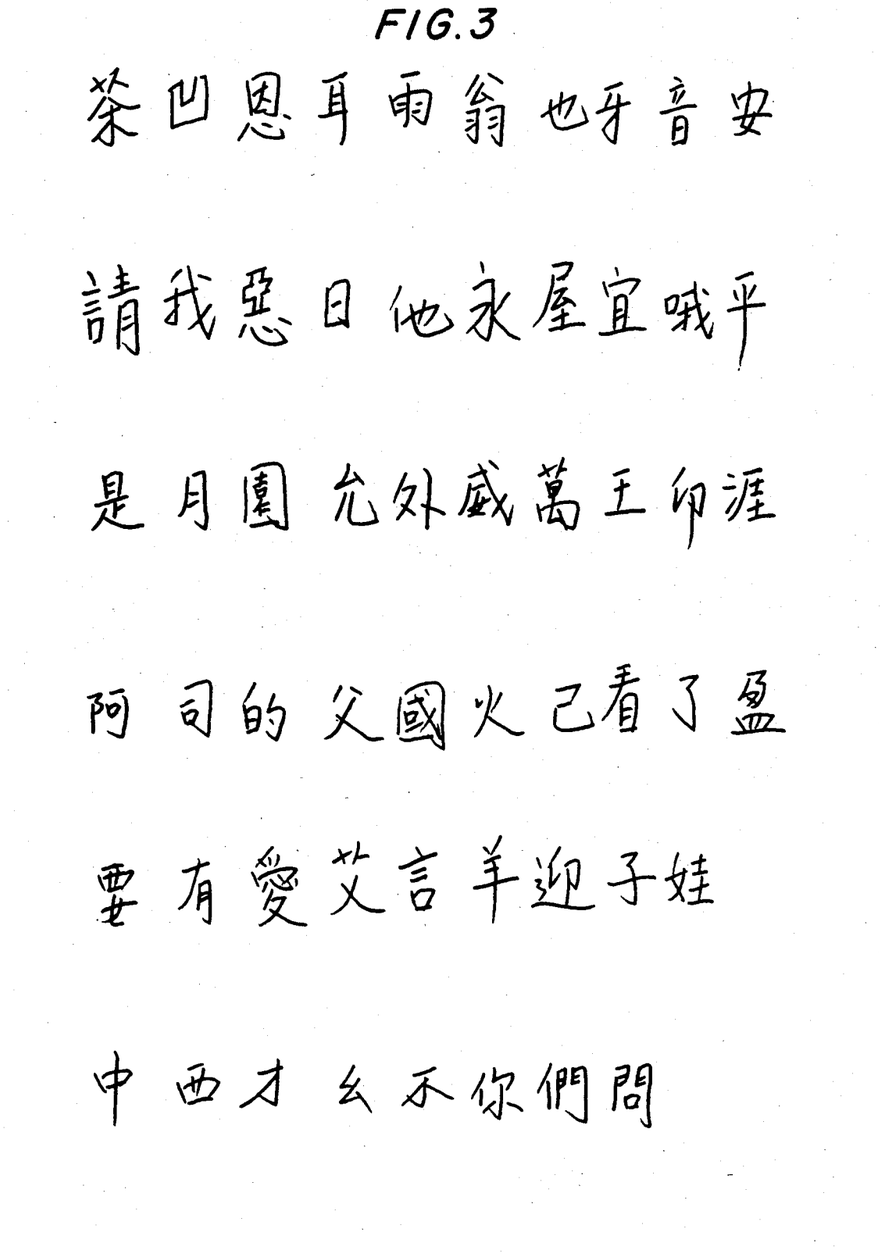
FIG. 3 is an illustration of the preferred font in accordance with the invention.
Figure 4:
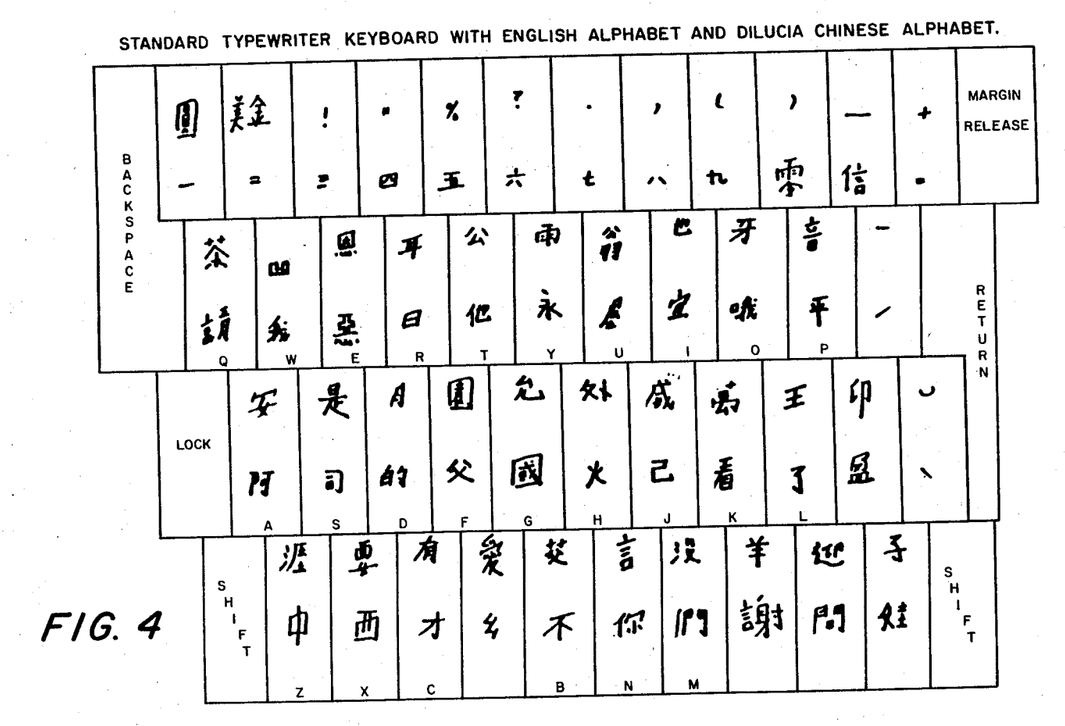
FIG. 4 is an illustration of the keyboard of a typing or printing apparatus, employing the font of the invention.
Figure 5A:
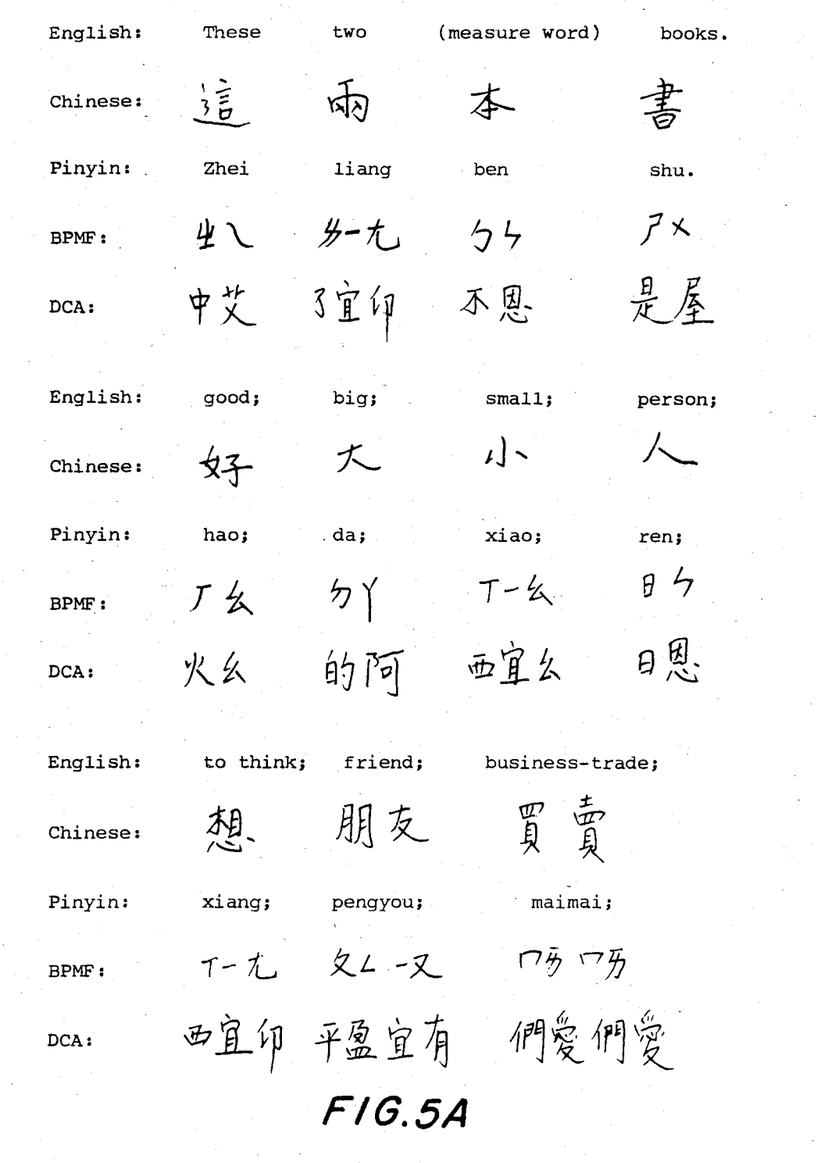
FIGS. 5A and 5B illustrations comparing various words in the English and Chinese language, PINYIN, BPMF and DCA.
Figure 5B:
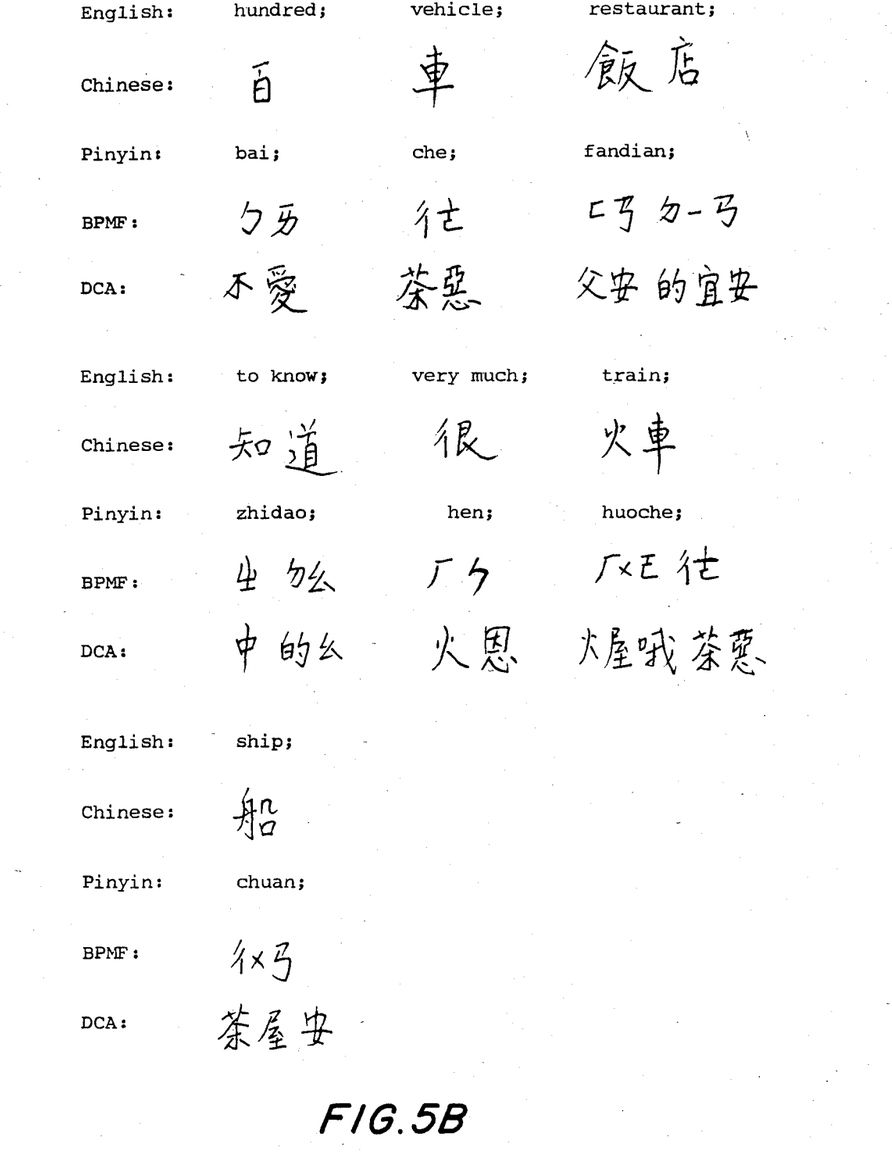

While the font of Chinese characters illustrated in FIG. 3, selected in accordance with the above discussed considerations, constitutes the preferred embodiment of the invention, it will be apparent that these considerations may equally well lead to the selection of a different font of characters, some or all of which may differ from those of FIG. 3, and the concept of my invention is hence not limited to the selection of this specific font. In accordance with the invention, it is necessary that all of the characters of the font be characters of the Chinese language. It is also preferred that the selected characters be phonetically associated with the sounds that they represent in the font of characters. It is further desirable, in accordance with the invention, that all of the strokes of characters of the Chinese language be represented in the selected font.

It is further apparent that my invention is not limited to the specific type of device employed for communication. Any conventional writer of the type having limited characters, for example, typewriters adapted for use with Roman-based alphabet characters, may be employed in accordance with the invention. Similarly, word processors and printing devices adapted primarily for use in the printing of Roman-based alphabet characters may also be employed in accordance with the invention. As employed in this disclosure, the term "printing apparatus" hence includes such typewriters, word processors, printing devices, etc.

While the invention has been disclosed and described with reference to a single embodiment, it will be apparent that variations and modifications may be made there, and it is, therefore, intended in the following claims to cover each such variation and modification as follows within the true spirit and concept of the invention.

What is claimed is:

1. A phonetic Chinese printing apparatus for communication in the Chinese language, wherein a font is provided of a group of characters comprising a phonetic alphabet, the improvement wherein said characters are conventional characters of the Chinese language, said apparatus being adapted to reproduce only 57 characters of the Chinese language, said font consisting of the font of characters illustrated in FIG. 3.

* * * * *